United States Patent
Jung et al.

(10) Patent No.: US 11,325,495 B2
(45) Date of Patent: May 10, 2022

(54) SOLAR CHARGING SYSTEM AND METHOD FOR VEHICLE

(71) Applicants: HYUNDAI MOTOR COMPANY, Seoul (KR); KIA MOTORS CORPORATION, Seoul (KR)

(72) Inventors: Hae Yoon Jung, Seongnam-si (KR); Sung Geun Park, Suwon-si (KR); Seung Bae Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 198 days.

(21) Appl. No.: 16/808,666

(22) Filed: Mar. 4, 2020

(65) Prior Publication Data
US 2021/0078428 A1  Mar. 18, 2021

(30) Foreign Application Priority Data
Sep. 18, 2019  (KR) .................. 10-2019-0114879

(51) Int. Cl.
| | |
|---|---|
| *B60L 58/12* | (2019.01) |
| *H02J 7/35* | (2006.01) |
| *B60L 53/51* | (2019.01) |
| *H02J 7/00* | (2006.01) |
| *H02J 7/14* | (2006.01) |
| *B60L 8/00* | (2006.01) |
| *B60L 50/60* | (2019.01) |
| *B60L 53/60* | (2019.01) |
| *B60L 53/20* | (2019.01) |
| *B60L 7/10* | (2006.01) |
| *B60K 6/22* | (2007.10) |

(52) U.S. Cl.
CPC ............. *B60L 58/12* (2019.02); *B60L 8/003* (2013.01); *B60L 50/66* (2019.02); *B60L 53/51* (2019.02); *B60L 53/60* (2019.02); *H02J 7/00036* (2020.01); *H02J 7/0048* (2020.01); *H02J 7/1423* (2013.01); *H02J 7/35* (2013.01); *B60K 6/22* (2013.01); *B60L 7/10* (2013.01); *B60L 53/20* (2019.02); *B60L 2210/10* (2013.01); *B60Y 2200/91* (2013.01); *B60Y 2200/92* (2013.01)

(58) Field of Classification Search
CPC ....................................................... B60L 58/12
USPC ......................................................... 320/101
See application file for complete search history.

(56) References Cited

U.S. PATENT DOCUMENTS

| | | | |
|---|---|---|---|
| 9,614,399 B2 | 4/2017 | Maeno | |
| 2008/0143292 A1* | 6/2008 | Ward | B60L 58/15 320/101 |
| 2013/0082645 A1* | 4/2013 | Fukada | H02J 7/35 320/107 |

(Continued)

FOREIGN PATENT DOCUMENTS

| | | |
|---|---|---|
| KR | 10-0182665 B1 | 5/1995 |
| KR | 10-0182664 B1 | 5/1999 |
| KR | 10-1743855 B1 | 6/2017 |

*Primary Examiner* — Jerry D Robbins
(74) *Attorney, Agent, or Firm* — Morgan, Lewis & Bockius LLP

(57) ABSTRACT

A solar charging system and method for a vehicle may include a battery mounted in the vehicle, a solar panel mounted on the vehicle to perform solar power generation, and a solar controller that receives electricity generated from the solar panel to operate, and controls charging of the battery using the electricity.

18 Claims, 12 Drawing Sheets

(56) References Cited

U.S. PATENT DOCUMENTS

| | | | |
|---|---|---|---|
| 2015/0349582 A1* | 12/2015 | Maeno | B60L 3/0046 |
| | | | 320/101 |
| 2017/0267113 A1* | 9/2017 | Harada | B60L 3/0084 |
| 2018/0043788 A1* | 2/2018 | Kuribara | B60L 8/003 |
| 2018/0105042 A1* | 4/2018 | Kuribara | B60L 53/51 |
| 2018/0134163 A1* | 5/2018 | Kuribara | B60L 53/38 |
| 2018/0201150 A1* | 7/2018 | Kubo | B60L 8/003 |
| 2019/0296575 A1* | 9/2019 | Yang | H02J 7/35 |

\* cited by examiner

[Level 0]

[Level 1]

[Level 2]

[Level 3]

SOLAR CHARGING SYSTEM AND METHOD FOR VEHICLE

CROSS-REFERENCE TO RELATED APPLICATION

The present application claims priority to Korean Patent Application No. 10-2019-0114879, filed on Sep. 18, 2019, the entire contents of which is incorporated herein for all purposes by this reference.

BACKGROUND OF THE INVENTION

Field of the Invention

The present invention relates to solar charging system and method for a vehicle.

Description of Related Art

A solar roof system refers to a roof type solar charging system that charges a battery through solar power generation by mounting a solar panel on a roof of a vehicle. In this connection, because output voltage and/or output current of the solar panel varies very greatly depending on an amount of light and temperature, a very sophisticated control technology is required for using the output of the solar panel as operating power.

A conventional solar controller is supplied with driving power from a solar battery that accumulates exclusively power generated through the solar panel. Furthermore, the solar controller charges the solar battery with the power generated through the solar panel mounted on the vehicle roof. The solar controller converts power output from the solar battery into charging voltage and/or charging current of a vehicle battery, and supplies the charging voltage and/or the charging current to the battery (e.g., 12 V battery and/or high voltage battery, or the like) to charge the vehicle battery. Accordingly, conventionally, because the power generated through the solar panel is charged to the solar battery, and the driving power of the solar controller and the charging power of the battery are supplied from the solar battery, a charging efficiency is low.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing solar charging system and method for a vehicle that directly charge a battery with electricity generated from a solar panel mounted on a vehicle.

Various aspects of the present invention provide solar charging system and method for a vehicle that receive electricity generated from a solar panel mounted on a vehicle as driving power to operate.

The technical problems to be solved by the present inventive concept are not limited to the aforementioned problems, and any other technical problems not mentioned herein will be clearly understood from the following description by those skilled in the art to which an exemplary embodiment of the present invention pertains.

According to various aspects of the present invention, a solar controller includes a processor that receives electricity generated from a solar panel to start to operate, determines whether a charging operation condition is satisfied based on state information related to the solar panel, and determines whether to activate a charging mode based on a start state of a vehicle and state information related to a vehicle battery, and a converter connected to the solar panel and converting output of the solar panel to charging power and supplying the charging power to the battery in a response to instruction of the processor.

In an exemplary embodiment of the present invention, the processor may determine that the charging operation condition is satisfied when an output power of the solar panel exceeds a predetermined initial power.

In an exemplary embodiment of the present invention, the processor may identify the start state of the vehicle through a start system when it is determined that the charging operation condition is satisfied.

In an exemplary embodiment of the present invention, the processor may compare state of charge of a first battery and state of charge of a second battery through a battery management system when the start of the vehicle is activated, select one of the first battery and the second battery as a charging target based on the comparison result, and activate the charging mode for charging the selected one of the first battery and the second battery.

In an exemplary embodiment of the present invention, the processor may determine whether a first charger in the vehicle is charging the first battery when activating a first battery charging mode, and charge the first battery using the output of the solar panel when the first charger is not charging the first battery.

In an exemplary embodiment of the present invention, the processor may charge the first battery using the first charger or the output of the solar panel based on a charging mode of the first charger when the first charger is charging the first battery.

In an exemplary embodiment of the present invention, the first charger may be implemented as a low voltage DC converter or an alternator.

In an exemplary embodiment of the present invention, the processor may, when activating a second battery charging mode, switch the second battery charging mode to a first battery charging mode when a second charger mounted in the vehicle is charging the second battery and battery voltage of the second battery exceeds reference voltage, and the second charger may be implemented as an inverter or a regenerative brake system.

In an exemplary embodiment of the present invention, the processor may wake up a battery management system when the start of the vehicle is deactivated; determine whether the output power of the solar panel exceeds a target power, charge the battery when the output power of the solar panel exceeds the target power, and activate a charging standby mode when the output power of the solar panel does not exceed the target power.

According to various aspects of the present invention, a solar charging system for a vehicle includes a battery mounted in the vehicle, a solar panel mounted on the vehicle to perform solar power generation, and a solar controller that receives electricity generated from the solar panel to operate and controls charging of the battery using the electricity.

According to various aspects of the present invention, a solar charging method for a vehicle includes determining, by the solar controller, whether a charging operation condition is satisfied based on state information related to a solar panel, determining, by the solar controller, whether a start of the vehicle is activated when output of the solar panel satisfies the charging operation condition, and determining, by the solar controller, whether to activate a charging mode based on a state of a battery when the start of the vehicle is activated.

In an exemplary embodiment of the present invention, the determining of whether the charging operation condition is satisfied may include determining, by the solar controller, that the charging operation condition is satisfied when an output power of the solar panel exceeds a predetermined initial power.

In an exemplary embodiment of the present invention, the determining of whether to activate the charging mode may include comparing, by the solar controller, state of charge of a first battery and state of charge of a second battery through a battery management system, selecting one of the first battery and the second battery as a charging target based on the comparison result, and activating a charging mode for charging the selected one of the first battery and the second battery.

In an exemplary embodiment of the present invention, the solar charging method may further include, after the determining of whether to activate the charging mode, determining, by the solar controller, whether a first charger in the vehicle is charging the first battery when activating a first battery charging mode, identifying a charging mode of the first charger when the first charger is charging the first battery, and charging the first battery using the first charger or the output of the solar panel based on the charging mode of the first charger.

In an exemplary embodiment of the present invention, the first charger may be implemented as a low voltage DC converter or an alternator.

In an exemplary embodiment of the present invention, the solar charging method may further include charging the first battery using the output of the solar panel when the first charger is not charging the first battery.

In an exemplary embodiment of the present invention, the solar charging method may further include, after the determining of whether to activate the charging mode, when activating a second battery charging mode, switching, by the solar controller, the second battery charging mode to a first battery charging mode when a second charger mounted in the vehicle is charging the second battery and a battery voltage of the second battery exceeds a reference voltage.

In an exemplary embodiment of the present invention, the second charger may be implemented as an inverter or a regenerative brake system.

In an exemplary embodiment of the present invention, the determining of whether the start of the vehicle is activated may include waking up a battery management system when the start of the vehicle is deactivated, determining whether the output power of the solar panel exceeds a target power, and charging the battery when the output power of the solar panel exceeds the target power.

In an exemplary embodiment of the present invention, the solar charging method may further include activating a charging standby mode when the output power of the solar panel does not exceed the target power.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
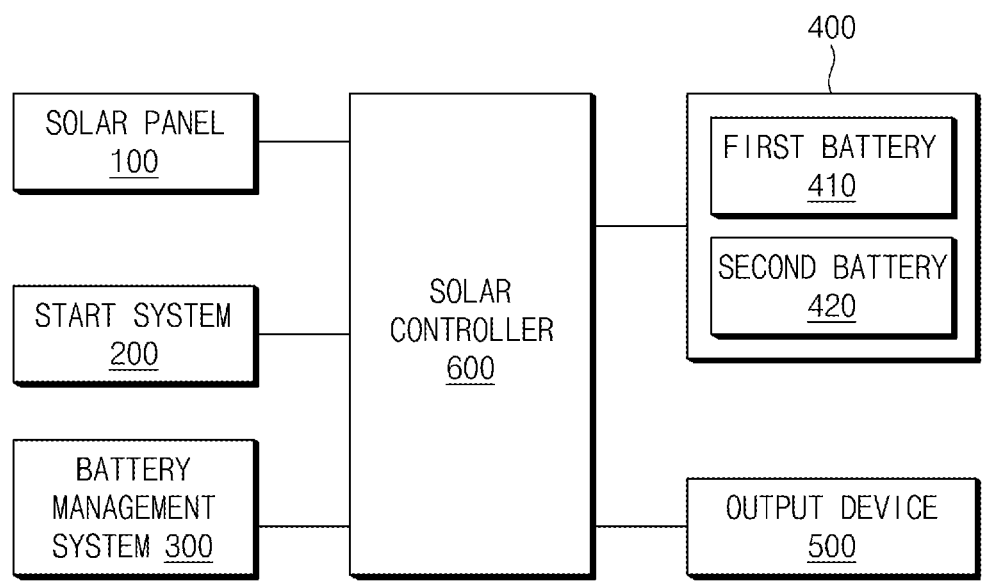
FIG. 1 is a block diagram illustrating a solar charging system for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In describing the components of the exemplary embodiment according to an exemplary embodiment of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, may be interpreted as having a meaning which is consistent with their meaning in the context of the relevant art and will not be interpreted in an idealized or overly formal sense unless so defined herein.

Figure 2:
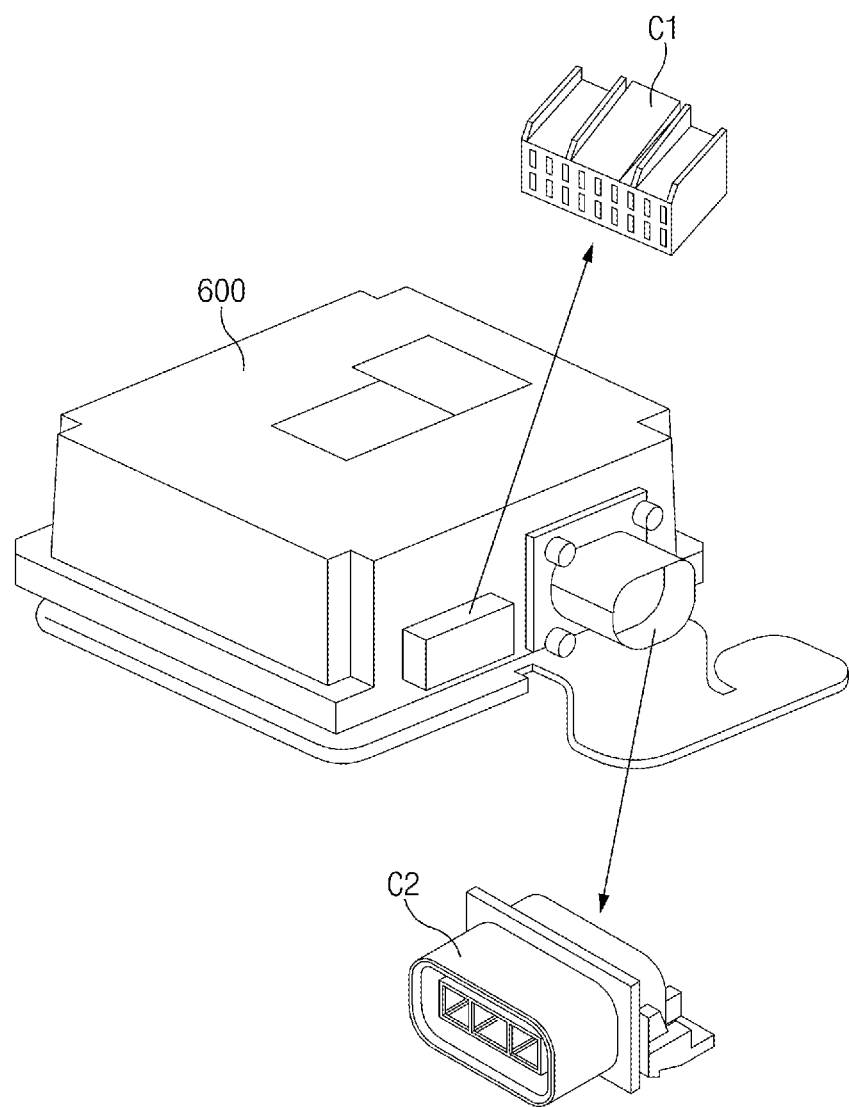
FIG. 2 is an external view of a solar controller illustrated in FIG. 1.

FIG. 1 is a block diagram illustrating a solar charging system for a vehicle according to an exemplary embodiment of the present invention. Furthermore, FIG. 2 is an external view of a solar controller illustrated in FIG. 1.

Referring to FIG. 1, a solar charging system for a vehicle includes a solar panel 100, a start system 200, a battery management system (BMS) 300, a battery 400, an output device 500, and a solar controller (or a solar charge controller) 600.

The solar panel (photovoltaic panel) 100 is mounted on a vehicle to convert light energy of a sun light ray into electrical energy. The solar panel 100 is mounted on a roof of a vehicle, but is not limited thereto. For example, the solar panel 100 may be mounted on a vehicle lid (bonnet). A form in which the solar panel 100 is mounted on the roof of the vehicle is referred to as a solar roof.

The start system 200 is for starting a power source in the vehicle, such as an engine and/or a motor, which may be implemented as an ignition (IGN) key, a starter switch, a start button, or the like. The start system 200 selects a type of supplying power into the vehicle based on a user's manipulation. In the present connection, the power supply type may be classified into vehicle power off (IGN OFF), accessory (ACC) power ON, start power (IGN power or vehicle power) ON, and the like. The start system 200 transmits the power supply type, that is, a start power state to the solar controller 600.

The start system 200 instructs supply (approval) of the accessory (ACC) power source or the IGN power source (the start power or the vehicle power source) based on a user input (the user manipulation). For example, the start system 200 outputs a control signal (ACC ON) instructing the supply of the accessory power to electronic devices such as audio video navigation telematics (AVNT) and/or electronic payment system (ETC). Furthermore, the start system 200 may output a control signal such as start power supply (IGN ON), start power off (IGN OFF), or the like.

The battery management system 300 is configured to optimally manage the battery 400 to increase energy efficiency and extend a lifespan thereof. The battery management system 300 monitors voltage, current, temperature, and the like of the battery 400 in real time to prevent overcharge or overdischarge. The battery management system 300 may determine a residual amount of the battery 400, that is, a state of charge (SOC).

The battery 400 supplies power to an electric device mounted in the vehicle, such as an electric control unit (ECU) and/or a driving motor (power source). The battery 400 may be charged by electricity produced by the solar panel 100. The battery 400 may include at least one of a first battery 410 and/or a second battery 420. In the present connection, the first battery 410 is a low voltage battery that supplies the accessory power or the start power, that is, a 12V battery, and the second battery 420 is a high voltage battery supplying power required for driving the driving motor.

The output device 500 outputs an operation state of the solar controller 600, an output state of the solar panel 100, and/or the state of charge of the battery 400, and the like as visual information. The output device 500 may include at least one of a liquid crystal display (LCD), a thin film transistor-liquid crystal display (TFT LCD), an organic light-emitting diode (OLED) display, a flexible display, a 3D display, a transparent display, a head-up display (HUD), a touch screen, and/or a cluster. Furthermore, the output device 500 may include an audio output module, such as a speaker, configured for outputting audio data, and/or a tactile information output module that outputs a signal in a form which may be perceived by the user.

The solar controller 600 operates by receiving only the electricity generated (produced) on the solar panel 100. Furthermore, the solar controller 600 may always charge the battery 400 with the electricity generated from the solar panel. The solar controller 600 includes two connectors, that is, a first connector C1 and a second connector C2, as shown in FIG. 2. The first connector C1 electrically connects the solar controller 600 with the solar panel 100, the start system 200, the battery management system 300, and the first battery 410. The second connector C2 electrically connects the solar controller 600 with the second battery 420.

When the electricity is started to be produced from the solar panel 100, the solar controller 600 receives the corresponding electricity and performs an initialization operation. The solar controller 600 monitors output voltage of the solar panel 100 and activates a ready mode when the output voltage exceeds threshold voltage. The solar controller 600 identifies the start power state through the start system 200 in the ready mode. When the start power state is the start power OFF state (start OFF state), the solar controller 600 may wake up the battery management system 300 to perform battery charging. When the start power state is the start power ON state (start ON state), the solar controller 600 attempts to charge the battery when the output power of the solar panel 100 is 1 W or more. The solar controller 600 monitors states of charge of the first battery 410 and the second battery 420, and determines at least one of the first battery 410 and/or the second battery 420 as a charging target. The solar controller 600 compares the states of charge of the first battery 410 and the second battery 420 every predetermined period to determine the charging target. The solar controller 600 charges the determined charging target with the power produced from the solar panel 100.

Figure 3:
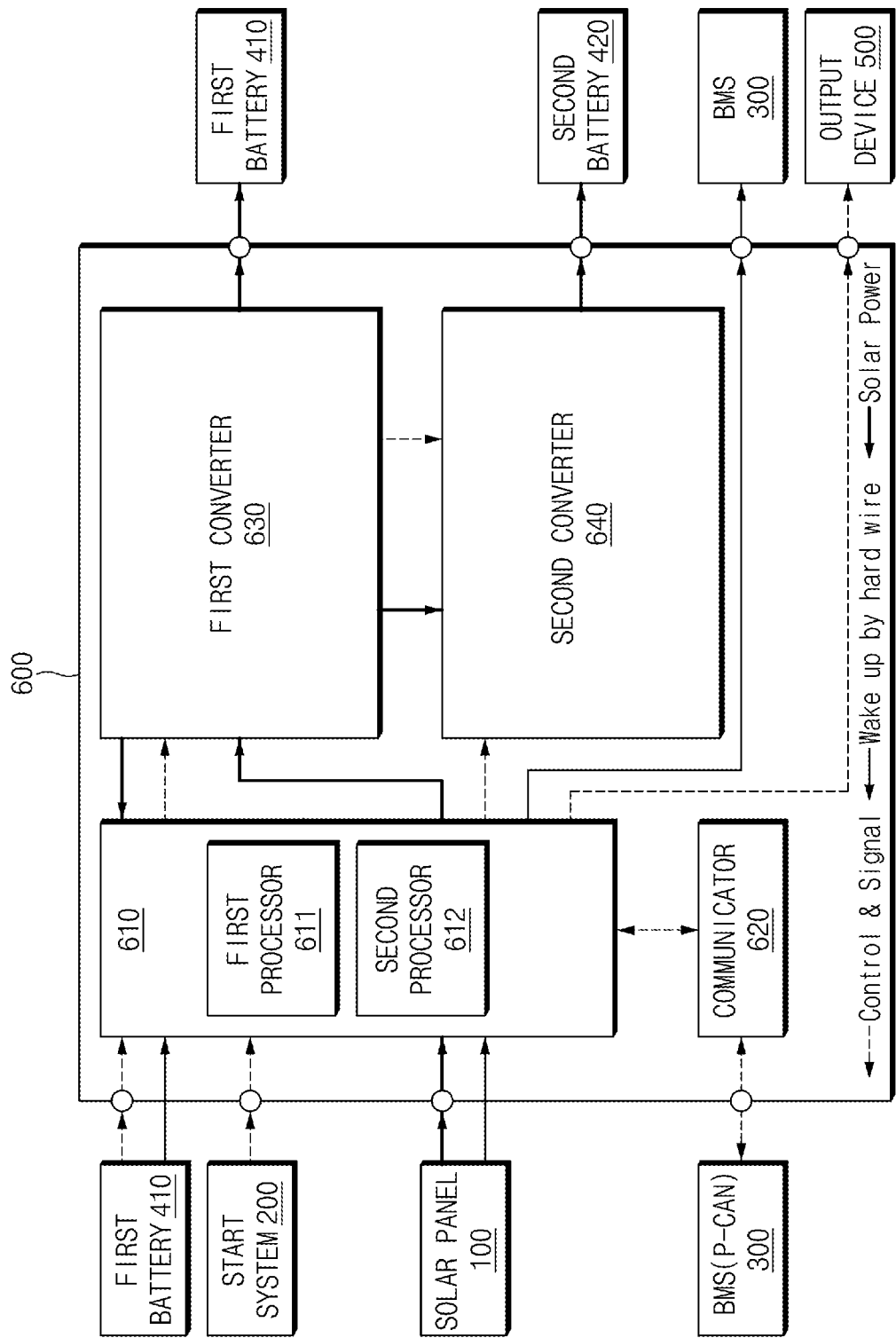
FIG. 3 is a block diagram illustrating a solar controller according to an exemplary embodiment of the present invention.

FIG. 3 is a block diagram illustrating the solar controller 600 according to an exemplary embodiment of the present invention.

Referring to FIG. 3, the solar controller 600 is a DC-DC converter for stepping-up or stepping-down a DC voltage produced from the solar panel 100, which may include a processor 610, a communicator 620, and a first converter 630, and a second converter 640.

The processor 610 controls overall operations of the solar controller 600. The processor 610 identifies charging information such as charging voltage, charging current, and/or the state of charge of the first battery 410 via communication with the first battery 410. Furthermore, the processor 610 may identify the start power state through the start system 200. The processor 610 receives the electricity, that is, solar power output from the solar panel 100. A P-type metal oxide semiconductor field effect transistor (PMOS FET) for preventing damage of the solar controller 600 caused by reverse voltage is disposed at an input terminal receiving the solar power. In other words, the PMOS FET is used for reverse voltage protection.

Such processor 610 includes a first processor 611 and a second processor 612. In the present connection, the first processor 611 and the second processor 612 may be implemented as at least one of an application specific integrated circuit (ASIC), a digital signal processor (DSP), a programmable logic device (PLD), field programmable gate arrays (FPGAs), a central processing unit (CPU), microcontrollers, and/or microprocessors. The processor 610 may include a memory that stores software programmed to allow the processor 610 to perform a predetermined operation, setting information, and the like. In the present connection, the memory may be implemented as at least one of storage media (recording media) such as a flash memory, a hard disk, an SD card (Secure Digital Card), a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, and the like.

When the solar panel 100 starts to produce the electricity, the first processor 611 starts to operate using the corresponding electricity as driving power. For example, when the solar power of equal to or greater than 1 W is applied from the solar panel 100, the first processor 611 starts to operate by the applied solar power. The first processor 611 monitors the output of the solar panel 100 when the first processor 611 is started to operate. The first processor 611 measures (detects) voltage and current output from the solar panel 100 through a voltage sensor and/or a current sensor. The first processor 611 determines the output power (the solar power) of the solar panel 100 using the measured voltage and current.

The first processor 611 determines whether the output (status information) of the solar panel 100 satisfies a charging operation condition through self-check. The first processor 611 determines whether the output voltage of the solar panel 100 exceeds initial voltage (threshold voltage) Vinit. When the output voltage of the solar panel 100 exceeds the initial voltage Vinit, the first processor 611 determines that the charging operation condition is satisfied. When the output voltage of the solar panel 100 does not exceed the initial voltage Vinit, the first processor 611 determines that the charging operation condition is not satisfied. In the present connection, the initial voltage Vinit is set in advance.

When it is determined that the charging operation condition is satisfied, the first processor 611 supplies the electricity generated from the solar panel 100 to the second processor 612. The second processor 612 utilizes the electricity generated from the solar panel 100 as driving power.

The second processor 612 determines whether the start is activated (IGN ON) through the start system 200. When the start is deactivated (IGN OFF), the second processor 612 wakes up the battery management system 300. At the instant time, the battery management system 300 receives the driving power from the first battery 410 at the wake up.

After waking up the battery management system 300, the second processor 612 obtains (measures) the output voltage and the output current of the solar panel 100 through the voltage sensor and the current sensor embedded in the solar controller 600. The second processor 612 determines the output power of the solar panel 100 using the obtained output voltage and output current. In the present connection, the second processor 612 estimates the output power of the solar panel 100 by determining based on measurement data of an ambient temperature of 25° C. In such method for determining the output power of the solar panel, an error rate may increase when the ambient temperature is an extremely low temperature or an extremely high temperature, or when an amount of light is very low (200 W or less). Therefore, in the instant case, when the battery management system 300 wakes up and the solar controller 600 starts the charging, accurate output power of the solar panel 100 may be determined using the embedded voltage sensor and current sensor.

The second processor 612 determines average output power $W_{average}$ of the solar panel 100 using the output voltage and the output current of the solar panel 100 measured for a predetermined time period. The second processor 612 determines whether the average output power $W_{average}$ exceeds target power $W_{target}$ (e.g., 20 W). The second processor 612 starts charging the battery 400 when the output power exceeds the target power. The second processor 612 waits for a predetermined set time when the output power is equal to or less than the target power. The battery management system 300 activates a sleep mode from a wakeup mode in a response to instruction of the second processor 612 when the output power is equal to or less than the target power. After the set time elapses, the second processor 612 re-activates a charging standby mode to identify the output power of the solar panel 100.

On the other hand, when the start is activated, the first processor 611 supplies the electricity output from the solar panel 100 to the second processor 612. That is, the second processor 612 starts to operate by the power applied from the solar panel 100.

The second processor 612 controls the output voltage and the output current of the solar panel 100 to obtain maximum power from the solar panel 100 using Maximum Power Point Tracking (MPPT). For example, when the solar panel 100 produces 100 W of power at 18 V, the second processor 612 converts the output voltage of the solar panel 100 into 12 V, which is the charging voltage, and changes the output current to 8.33 A (=100 W/12V).

The second processor 612 may identify the state of the battery 400, and determine whether to activate a charging mode or prohibit (limit) the charging mode entry based on the identification result. In the present connection, state information related to the battery 400 may be provided from the battery management system 300. Furthermore, the second processor 612 compares the states of charge of the first battery 410 and the second battery 420 with each other, and selects one of the first battery 410 and the second battery 420 as the charging target.

When the SOC value of the first battery 410 (first battery SOC) exceeds the SOC value of the second battery 420 (second battery SOC) and the first battery SOC is equal to or less than a first reference SOC, the second processor 612 selects the first battery 410 as the charging target and activates a corresponding first battery charging mode. When the first battery SOC exceeds the second battery SOC and the first battery SOC exceeds the first reference SOC, the second processor 612 selects the second battery 420 as the charging target and activates a second battery charging mode. Furthermore, when the first battery SOC does not exceed the second battery SOC and the first battery SOC is less than a second reference SOC, the second processor 612 selects the first battery 410 as the charging target and activates the first battery charging mode. When the first battery SOC does not exceed the second battery SOC and the first battery SOC is equal to or greater than the second reference SOC, the second processor 612 selects the second battery 420 as the charging target and activates the second battery charging mode.

When activating the first battery charging mode, the second processor 612 determines whether a first charger mounted in the vehicle is charging the first battery 410. In other words, the second processor 612 determines whether the second processor 612 collides with the first charger mounted in the vehicle. In the present connection, the first charger may be a low voltage DC converter (LDC), an alternator, or the like. When the first charger is not charging the first battery 410, the second processor 612 charges the first battery 410 using the output power of the solar panel 100.

On the other hand, when the first charger is charging the first battery 410, the second processor 612 determines whether the first charger is in a 100% charging mode. When the first charger is in the 100% charging mode, the second processor 612 allows the first charger to charge the first battery 410. That is, when the charging mode of the first charger is the 100% charging mode, the second processor 612 allows the first charger to continue charging the first battery 410. On the other hand, when the first charger is not in the 100% charging mode, the second processor 612 reduces the output power of the first charger, and charges the first battery 410 with the output power of the solar panel 100.

When activating the second battery charging mode, the second processor 612 determines whether a second charger mounted in the vehicle is charging the second battery 420 and battery voltage of the second battery 420 exceeds reference voltage. In the present connection, the second charger may be an inverter, a regenerative brake system, or the like. When the second charger is charging the second battery 420 and the voltage of the second battery 420 exceeds the reference voltage (e.g., 309 V), the second processor 612 switches an operation mode of the solar controller 600 from the second battery charging mode to the first battery charging mode. When the second charger is not charging the second battery 420 and/or when the battery voltage of the second battery 420 is equal to or less than the reference voltage, the second processor 612 charges the second battery 420 with the output power of the solar panel 100.

The second processor 612 may perform failure diagnosis of the solar controller 600 by itself based on a predetermined failure diagnosis logic. When a failure of the solar controller 600 is diagnosed, the second processor 612 may output a warning indicating the failure through the output device 500.

Furthermore, the second processor 612 may execute a battery discharge protection logic stored in advance in a memory to protect discharge of the battery 400 under a malicious condition. In the present connection, the malicious condition refers to a condition in which discharge of the first battery 410 occurs as the output of the solar panel 100 changes up and down several times based on the target power, such as sunrise or sunset time.

The communicator 620 communicates with the battery management system 300 and/or the output device 500 using an in-vehicle network (IVN). The in-vehicle network may be implemented as a Controller Area Network (CAN), a Media Oriented Systems Transport (MOST) network, a Local Interconnect Network (LIN), an X-by-Wire (Flexray), and the like.

The communicator 620 receives the state information related to the battery 400 from the battery management system 300. Furthermore, the communicator 620 may output information such as output information related to the solar panel 100 and/or the operation mode (operation state) of the solar controller 600 in a response to instruction of the second processor 612.

The first converter 630 converts the output power (voltage and/or current) of the solar panel 100 to charge the first battery 410. The first converter 630 converts the output voltage and/or the output current output from the solar panel 100 into the charging voltage and the charging current of the first battery 410, respectively. For example, the first converter 630 steps-down the output voltage of the solar panel 100 and supplies the stepped-down output voltage to the first battery 410. The first converter 630 may be implemented as a buck converter.

The second converter 640 converts the output power of the solar panel 100 to charge the second battery 420. The second converter 640 converts the output voltage and the output current of the solar panel 100 into the charging voltage and/or the charging current of the second battery 420, respectively. The second converter 640 may be implemented as a boost converter. For example, the second converter 640 steps-up the output voltage of the solar panel 100 and supplies the stepped-up output voltage as the charging voltage of the second battery 420.

Figure 4:
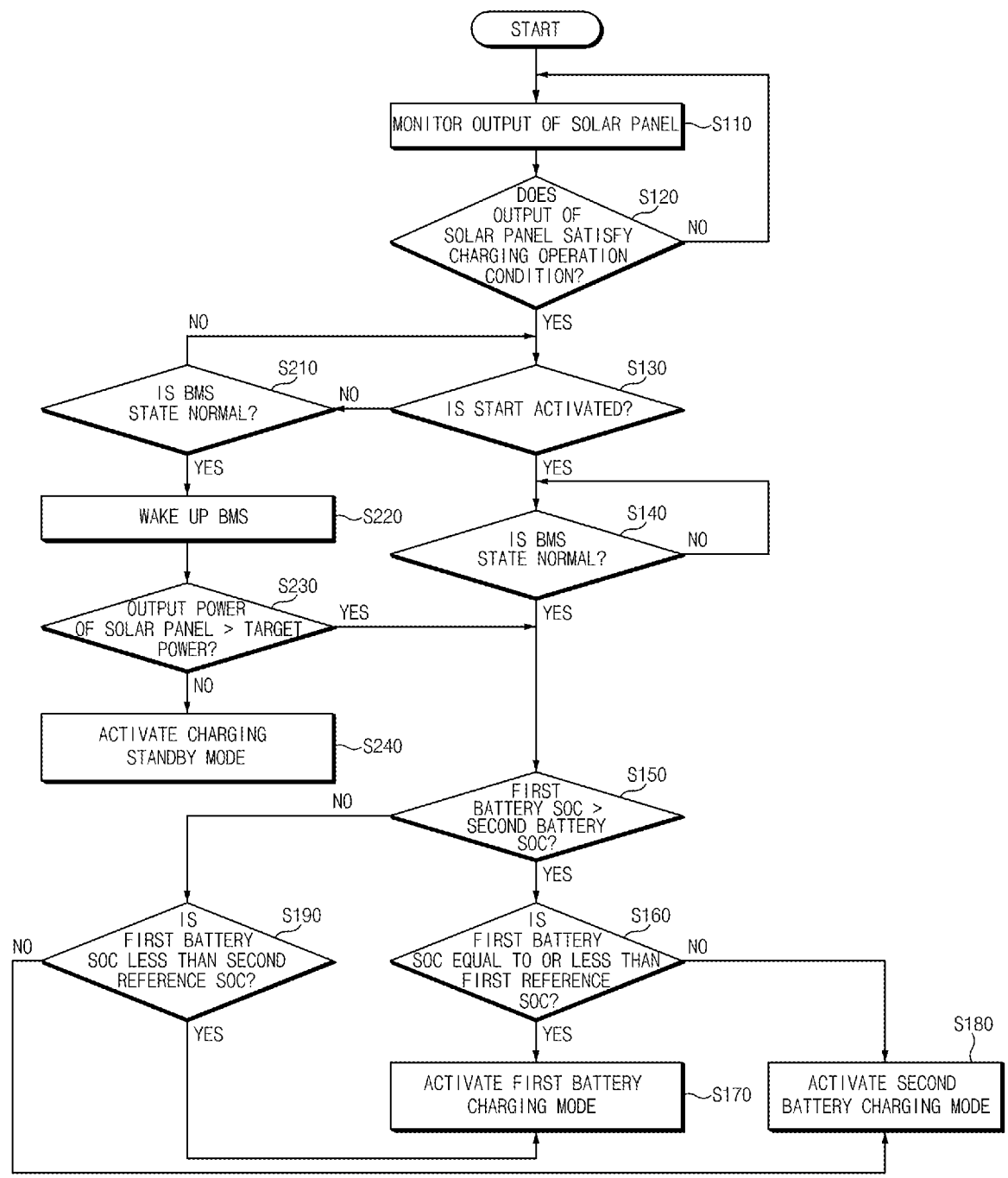
FIG. 4 is a flowchart illustrating a solar charging method for a vehicle according to an exemplary embodiment of the present invention.

FIG. 4 is a flowchart illustrating a solar charging method for a vehicle according to an exemplary embodiment of the present invention.

Referring to FIG. 4, the solar controller 600 monitors the output of the solar panel 100 (S110). The first processor 611 of the solar controller 600 starts to operate by the electricity (solar power) generated from the solar panel 100, and monitors the output power of the solar panel 100.

The solar controller 600 determines whether the output of the solar panel 100 satisfies the charging operation condition (S120). The first processor 611 determines whether the output voltage of the solar panel 100 exceeds the initial voltage Vinit.

When the output of the solar panel 100 satisfies the charging operation condition, the solar controller 600 determines whether the start is activated (IGN ON) through the start system 200 (S130). When the output voltage of the solar panel 100 exceeds the initial voltage Vinit, the first processor 611 supplies the solar power to the second processor 612. The second processor 612 determines whether the start is activated via the communication with the start system 200. For example, the second processor 612 identifies a position of the start key (IG key) through the start system 200, so that the second processor 612 may determine whether the start is activated.

In the start power ON state, the solar controller 600 determines whether a state (hereinafter, BMS state) of the battery management system 300 is normal (S140). The second processor 612 may identify the BMS state via the communication with the battery management system 300.

When the BMS state is normal, the solar controller 600 determines whether the state of charge of the first battery 410 (hereinafter, referred to as the first battery SOC) exceeds the state of charge of the second battery 420 (hereinafter, referred to as the second battery SOC) (S150). In other words, the second processor 612 determines whether a residual amount of the first battery 410 exceeds a residual amount of the second battery 420. The second processor 612 may obtain the battery state information related to the first battery SOC, the second battery SOC, and the like in communication with the battery management system 300.

When the first battery SOC exceeds the second battery SOC, the solar controller 600 determines whether the first battery SOC is equal to or less than the first reference SOC (e.g., 99%) (S160). The second processor 612 determines whether the SOC value of the first battery 410 exceeds the first reference SOC.

When the first battery SOC is equal to or less than the first reference SOC, the solar controller 600 activates the first battery charging mode (S170). That is, the second processor 612 determines the charging target as the first battery 410, and controls the first converter 630 to start the charging operation of the first battery 410.

When the first battery SOC exceeds the first reference SOC in S160, the solar controller 600 activates the second battery charging mode (S180). The second processor 612 selects the second battery 420 as the charging target, and controls the second converter 640 to start the charging operation of the second battery 420.

When the first battery SOC is equal to or less than the second battery SOC in S150, the solar controller 600 determines whether the first battery SOC is less than the second reference SOC (S190). The second processor 612 activates the first battery charging mode when the first battery SOC is less than the second reference SOC (S170), and activates the second battery charging mode when the first battery SOC is equal to or greater than the second reference SOC (S180).

Furthermore, when the start is not activated in S130, the solar controller 600 determines whether the BMS state is normal (S210). When the BMS state is normal, the solar controller 600 wakes up the battery management system 300 through a hard-wire (S220). The solar controller 600 receives the battery state information from the battery management system 300 and selects one of the first battery 410 and the second battery 420 as the charging target. When the BMS state is not normal, the solar controller 600 returns to S130 and determines whether the start is activated.

The solar controller 600 determines whether the output power of the solar panel 100 exceeds the target power $W_{target}$ after S220 (S230). The second processor 612 determines whether the solar power output from the solar panel 100 exceeds 20 W. The solar controller 600 performs the operations after S150 when the output power of the solar panel 100 exceeds the target power. On the other hand, when the output power of the solar panel 100 does not exceed the target power, the solar controller 600 activates the charging standby mode (S240).

Figure 5:
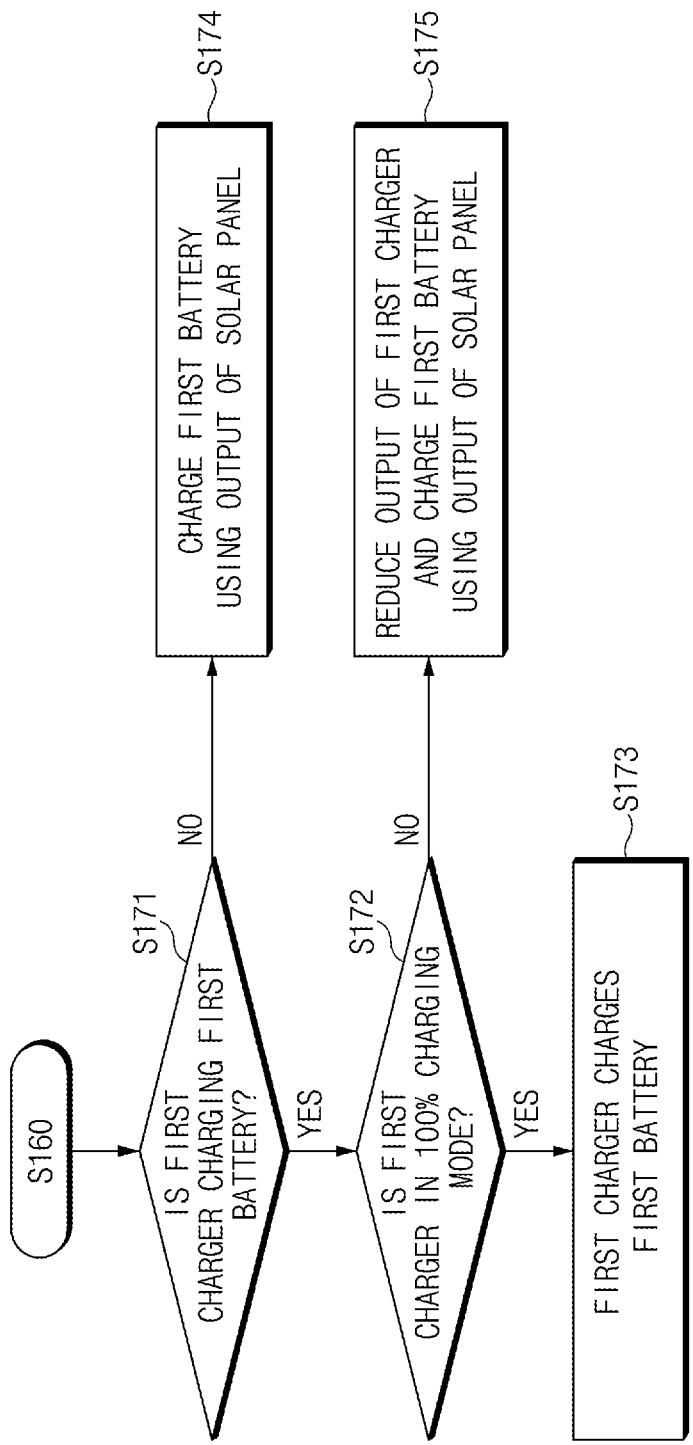
FIG. 5 is a flowchart illustrating a charging control process in a first battery charging mode illustrated in FIG. 4.

FIG. 5 is a flowchart illustrating a charging control process in a first battery charging mode illustrated in FIG. 4.

Referring to FIG. 5, when activating the first battery charging mode, the solar controller 600 determines whether the first charger mounted in the vehicle is charging the first battery 410 (S171). The second processor 612 determines whether the second processor 612 collides with the first charger mounted in the vehicle. In the present connection, the first charger may be the LDC, the alternator, or the like.

When the first charger is charging the first battery 410, the solar controller 600 determines whether the first charger is in the 100% charging mode (S172). The second processor 612 determines the charging mode of the first charger when the second processor 612 collides with the first charger.

The solar controller 600 allows the first charger to charge the first battery 410 when the first charger is in the 100% charging mode (S173). That is, the second processor 612 allows the first charger to continue charging the first battery 410 when the charging mode of the first charger is the 100% charging mode.

On the other hand, when the first charger is not charging the first battery 410 in S171, the solar controller 600 charges the first battery 410 using the output power of the solar panel 100 (S174).

On the other hand, when the first charger is not in the 100% charging mode in S172, the solar controller 600 reduces the output power of the first charger, and charges the first battery 410 with the output power of the solar panel 100 (S175).

Figure 6:
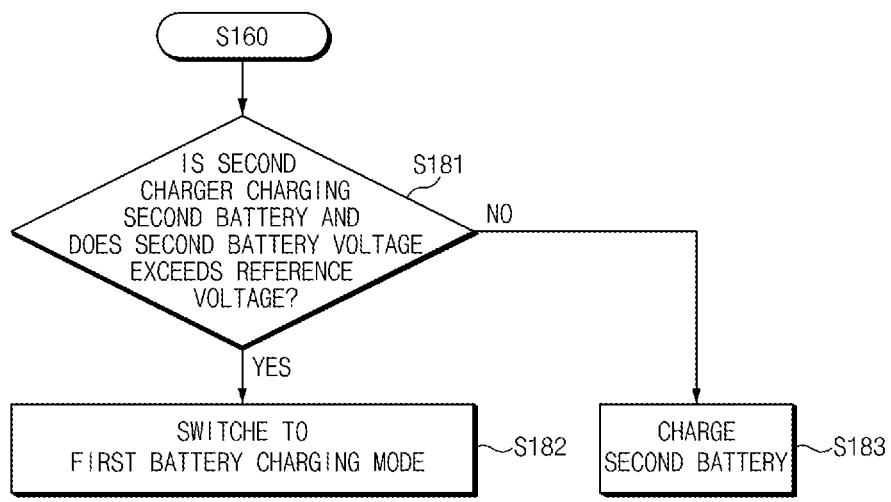
FIG. 6 is a flowchart illustrating a charging control process in a second battery charging mode illustrated in FIG. 4.

FIG. 6 is a flowchart illustrating a charging control process in a second battery charging mode illustrated in FIG. 4.

Referring to FIG. 6, when activating the second battery charging mode, the solar controller 600 determines whether the second charger mounted in the vehicle is charging the second battery 420 and whether the battery voltage of the second battery 420 exceeds the reference voltage (S181). In the present connection, the second charger may be the inverter, the regenerative brake system, or the like.

When the second charger is charging the second battery 420 and the voltage of the second battery 420 exceeds the reference voltage (e.g., 309 V), the solar controller 600 switches the operation mode of the solar controller 600 from the second battery charging mode to the first battery charging mode (S182).

When the second charger is not charging the second battery 420 and/or when the battery voltage of the second battery 420 is equal to or less than the reference voltage, the solar controller 600 charges the second battery 420 with the output power of the solar panel 100 (S183).

Figure 7:
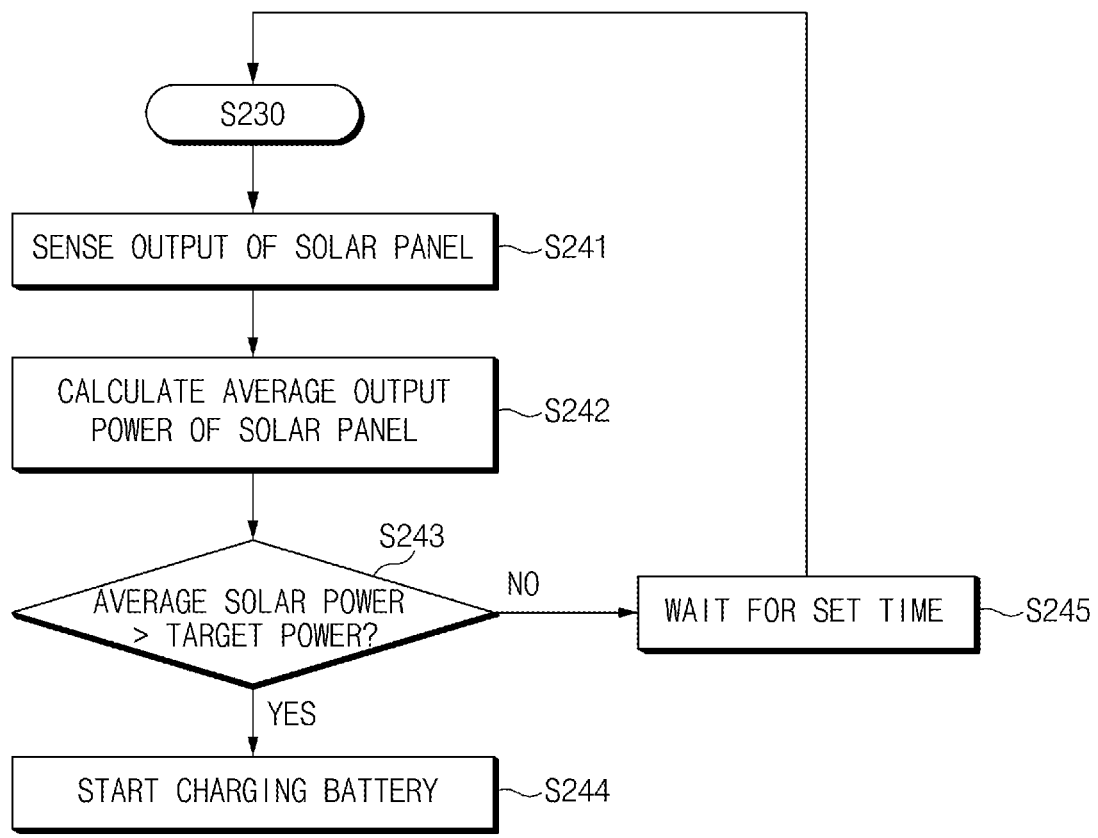
FIG. 7 is a flowchart illustrating a charging control process in a charging standby mode illustrated in FIG. 4.

FIG. 7 is a flowchart illustrating a charging control process in a charging standby mode illustrated in FIG. 4.

Referring to FIG. 7, when activating the charging standby mode, the solar controller 600 detects the output of the solar panel 100 using the embedded sensor (S241). The second processor 612 measures (obtains) the output voltage and the output current of the solar panel 100 for the specific time using the voltage sensor and the current sensor.

The solar controller 600 determines the average output power (average solar power) of the solar panel 100 using the sensor data (S242). The second processor 612 determines the average output power (average solar power) using the output voltage and the output current measured for the specific time.

The solar controller 600 determines whether the average solar power $W_{average}$ exceeds the target power $W_{target}$ (S243). When the average solar power $W_{average}$ exceeds the target power $W_{target}$, the solar controller 600 starts charging the battery 400 (S244). In the present connection, after waking up the battery management system 300, the solar controller 600 starts charging the battery selected based on the battery state information obtained from the battery management system 300. On the other hand, when the average solar power $W_{average}$ is equal to or less than the target power $W_{target}$, the solar controller 600 waits for the set time (e.g., 3 minutes) (S245).

Accordingly, in the charging standby mode, the battery is charged only when the average solar power exceeds the target power. Therefore, the charging current by the solar panel 100 is smaller than the current of the battery 400, preventing the battery discharge.

Figure 8:
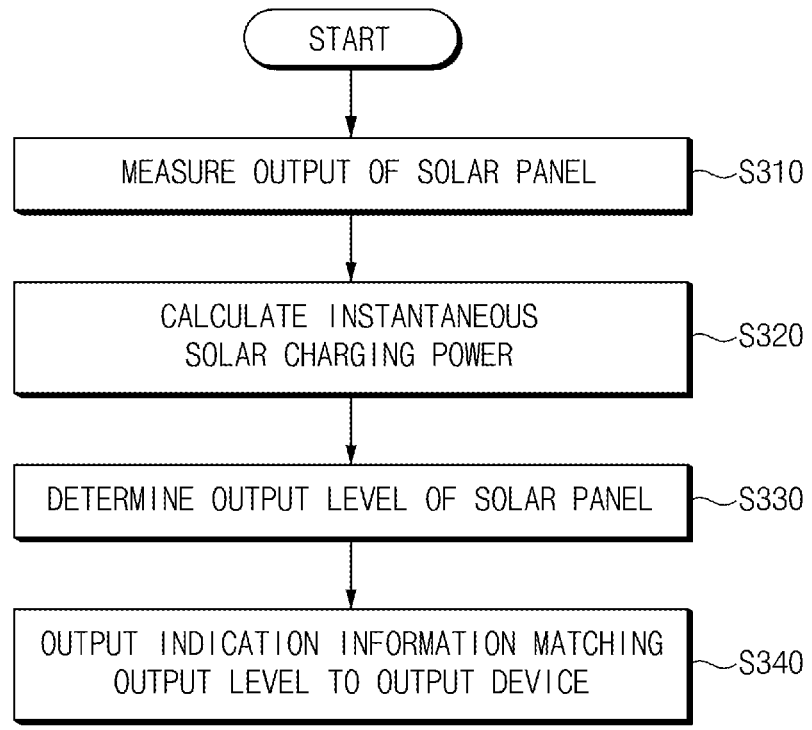
FIG. 8 is a flowchart illustrating a method for indicating an operation state of a solar controller according to an exemplary embodiment of the present invention.
Figure 9:
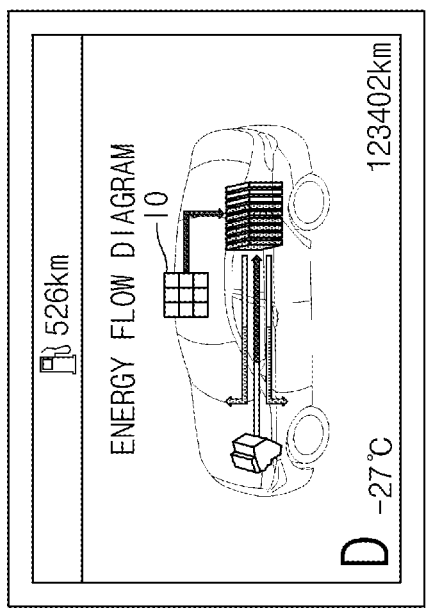
FIG. 9 is an example illustrating operation states of a solar controller based on FIG. 8.
Figure 9:
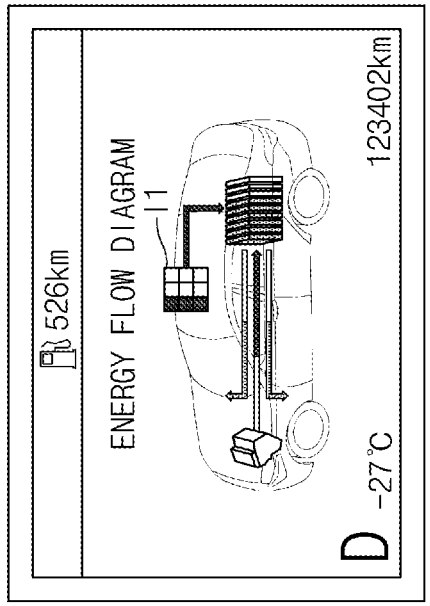
Figure 9:
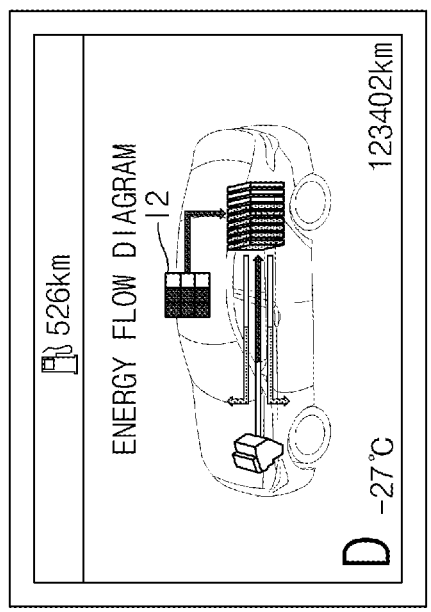
Figure 9:
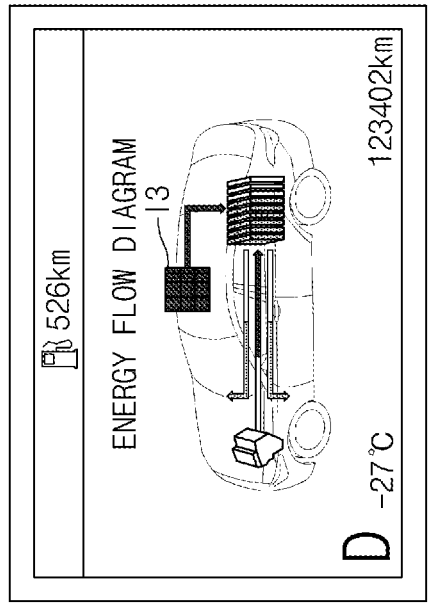

FIG. 8 is a flowchart illustrating a method for indicating an operation state of a solar controller according to an exemplary embodiment of the present invention. Furthermore, FIG. 9 is an example illustrating operation states of a solar controller based on FIG. 8.

Referring to FIG. 8, the solar controller 600 measures the output of the solar panel 100 through the voltage sensor and the current sensor (S310). In other words, the second processor 612 of the solar controller 600 measures the output voltage and the output current of the solar panel 100 through the embedded voltage sensor and current sensor.

The solar controller 600 determines instantaneous solar charging power based on the measured sensor data (S320). The second processor 612 determines the instantaneous solar charging power using the measured output voltage and output current.

The solar controller 600 determines an output level of the solar panel 100 based on the instantaneous solar charging power (S330). The solar controller 600 determines the output level as level 1 when the instantaneous solar charging power is 1 to 60 W, as level 2 when 61 to 130 W, and as level 3 when 131 W or greater.

The solar controller 600 may output indication information (charging indicator) matching the output level of the solar panel 100 to the output device 500 (S340). In the present connection, the indication information may be implemented in a form of an image, an icon, a voice signal, and/or a text.

For example, as shown in FIG. 9, when there is no output from the solar panel 100, the solar controller 600 displays a solar panel image 10 corresponding to level 0. Furthermore, when the output of the solar panel 100 increases, the solar controller 600 may display, on the cluster, solar panel images I1, I2, and I3 respectively corresponding to the levels 1, 2, and 3 based on the output increase.

Figure 10:
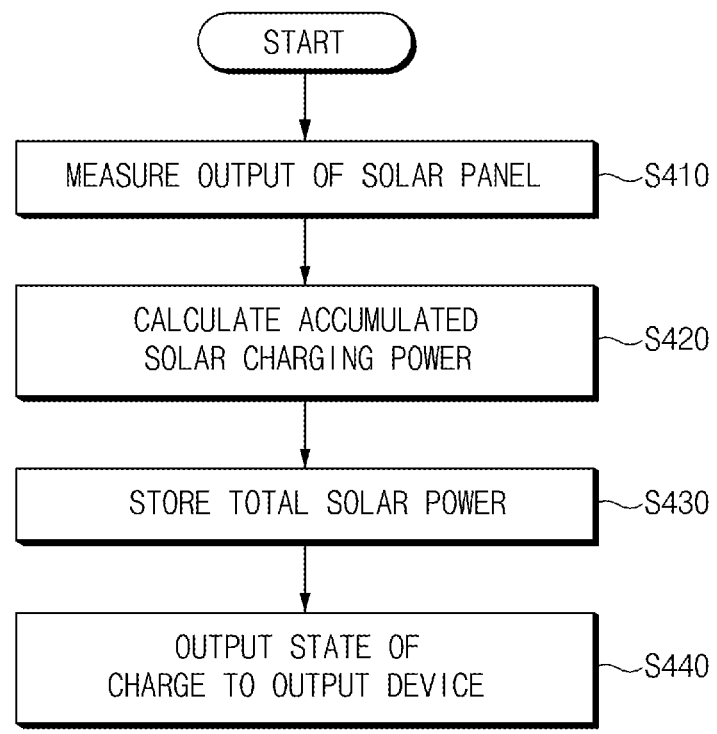
FIG. 10 is a flowchart illustrating a method for indicating an operation state of a solar controller according to various exemplary embodiments of the present invention.
Figure 11:
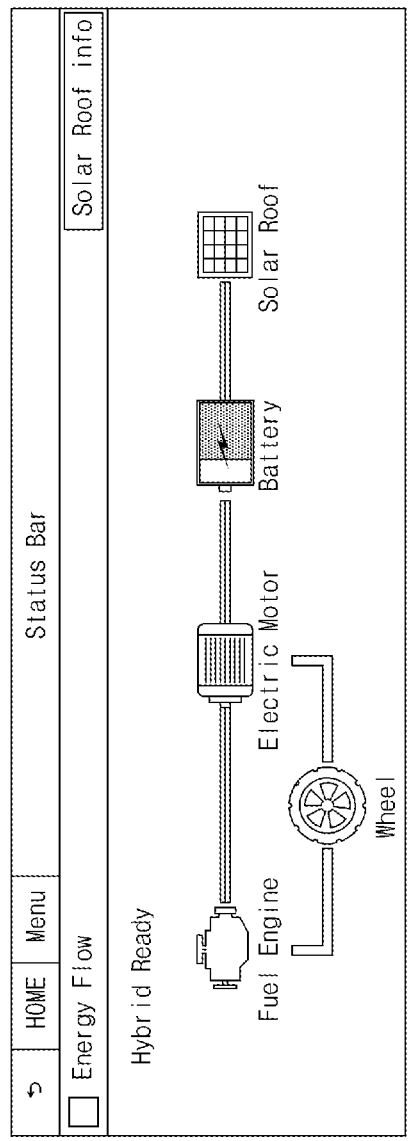
FIG. 11 is another example of indicating an operation state of a solar controller based on FIG. 10.

FIG. 10 is a flowchart illustrating a method for indicating an operation state of a solar controller according to various exemplary embodiments of the present invention. Furthermore, FIG. 11 is another example of indicating an operation state of a solar controller based on FIG. 10.

The solar controller 600 measures the output of the solar panel 100 through the voltage sensor and the current sensor (S410). In other words, the second processor 612 of the solar controller 600 measures the output voltage and the output current of the solar panel 100 through the embedded voltage sensor and current sensor.

The solar controller 600 determines accumulated solar charging power using the measured output voltage and output current (S420).

The solar controller 600 stores total solar power based on the determined accumulated solar charging power (S430).

The solar controller 600 outputs the state of charge to the output device 500 based on the total solar power (S440). As shown in FIG. 11, the solar controller 600 visualizes the state of charge of the battery 400 and displays the state of charge of the battery 400 on the display of the output device 500.

Figure 12:
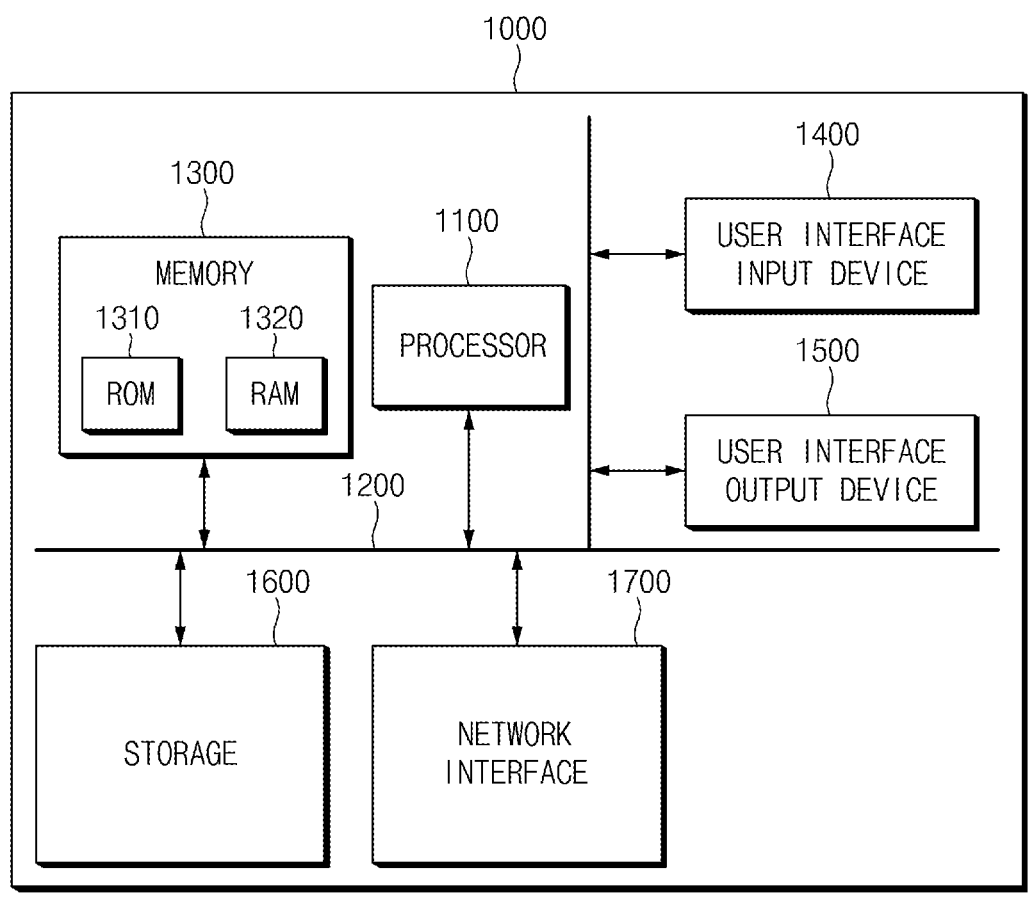
FIG. 12 is a block diagram illustrating a computing system executing a solar charging method for a vehicle according to an exemplary embodiment of the present invention.

FIG. 12 is a block diagram illustrating a computing system executing a solar charging method according to an exemplary embodiment of the present invention.

Referring to FIG. 12, a computing system 1000 may include at least one processor 1100, a memory 1300, a user interface input device 1400, a user interface output device 1500, storage 1600, and a network interface 1700 connected via a system bus 1200.

The processor 1100 may be a central processing unit (CPU) or a semiconductor device that performs processing on instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present invention, and various modifications and changes may be made by those skilled in the art without departing from the essential characteristics of the present invention. Therefore, the exemplary embodiments included in an exemplary embodiment of the present invention are not intended to limit the technical idea of the present invention but to illustrate the present invention, and the scope of the technical idea of the present invention is not limited by the embodiments. The scope of the present invention may be construed as being covered by the scope of the appended claims, and all technical ideas falling within the scope of the claims may be construed as being included in the scope of the present invention.

According to an exemplary embodiment of the present invention, the number of parts and weight may be reduced by reducing controllers inside the solar controller such that the battery is directly charged with the electricity generated from the solar panel mounted on the vehicle.

Furthermore, according to an exemplary embodiment of the present invention, the solar charging system operates by receiving the electricity generated from the solar panel mounted on the vehicle as the driving power, so that dark current generated when the start of the vehicle is deactivated may be prevented.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A solar controller comprising:
a processor configured to:
receive electricity generated from a solar panel;

determine when a charging operation condition is satisfied based on state information related to the solar panel; and determine when to activate a charging mode based on a start state of a vehicle and state information related to a battery of the vehicle; and a converter connected to the solar panel and converting output of the solar panel to charging power and supplying the charging power to the battery in a response to instruction of the processor, wherein the battery of the vehicle includes a first battery and a second battery, and wherein the processor is configured to:
compare a state of charge of the first battery and a state of charge of the second battery through a battery management system when a start of the vehicle is determined to be activated;
select one of the first battery and the second battery as a charging target based on a result of comparing the state of charge of the first battery and the state of charge of the second battery; and
activate the charging mode for charging the selected one of the first battery and the second battery.

2. The solar controller of claim 1, wherein the processor is configured to determine that the charging operation condition is satisfied upon determining that an output power of the solar panel exceeds a predetermined initial power.

3. The solar controller of claim 2, wherein the processor is configured to identify the start state of the vehicle through a start system upon determining that the charging operation condition is satisfied.

4. The solar controller of claim 3, wherein the processor is configured to:
determine when a first charger in the vehicle is charging the first battery when a first battery charging mode is determined to be activated; and
charge the first battery using the output of the solar panel upon determining that the first charger is not charging the first battery.

5. The solar controller of claim 4, wherein the processor is configured to charge the first battery using the first charger or the output of the solar panel based on a charging mode of the first charger upon determining that the first charger is charging the first battery.

6. The solar controller of claim 5, wherein the first charger is implemented as a DC converter supplying a voltage lower than a predetermined value or an alternator.

7. The solar controller of claim 3,
wherein the processor is configured to, when a second battery charging mode is determined to be activated, switch the second battery charging mode to a first battery charging mode upon determining that a second charger mounted in the vehicle is charging the second battery and a battery voltage of the second battery exceeds a reference voltage, and
wherein the second charger is implemented as an inverter or a regenerative brake system.

8. The solar controller of claim 3, wherein the processor is configured to:
wake up the battery management system when the start of the vehicle is determined to be deactivated;
determine when an output power of the solar panel exceeds a target power;
charge the battery when the output power of the solar panel is determined to exceed the target power; and
activate a charging standby mode when the output power of the solar panel is determined to not exceed the target power.

9. A solar charging method for a vehicle, the solar charging method comprising:
determining, by the solar controller of claim 1, when the charging operation condition is satisfied based on the state information related to the solar panel;
determining, by the solar controller, when the start of the vehicle is activated upon determining that the output of the solar panel satisfies the charging operation condition; and
determining, by the solar controller, when to activate the charging mode based on a state of the battery upon determining that the start of the vehicle is activated,
wherein the battery of the vehicle includes the first battery and the second battery, and
wherein the determining of when to activate the charging mode includes:
comparing, by the solar controller, the state of charge of the first battery and the state of charge of the second battery through the battery management system;
selecting one of the first battery and the second battery as the charging target based on a result of comparing the state of charge of the first battery and the state of charge of the second battery through the battery management system; and
activating the charging mode for charging the selected one of the first battery and the second battery.

10. The solar charging method of claim 9, wherein the determining of when the charging operation condition is satisfied includes:
determining, by the solar controller, that the charging operation condition is satisfied when an output power of the solar panel is determined to exceed a predetermined initial power.

11. The solar charging method of claim 9, further including:
after the charging mode is determined to be activated:
determining, by the solar controller, when a first charger in the vehicle is charging the first battery upon determining that a first battery charging mode is activated;
identifying a charging mode of the first charger upon determining that the first charger is charging the first battery; and
charging the first battery using the first charger or the output of the solar panel based on the charging mode of the first charger.

12. The solar charging method of claim 11, wherein the first charger is implemented as a DC converter supplying a voltage lower than a predetermined value or an alternator.

13. The solar charging method of claim 11, further including:
charging the first battery using the output of the solar panel upon determining that the first charger is not charging the first battery.

14. The solar charging method of claim 9, further including:
after the charging mode is determined to be activated:
upon activating a second battery charging mode, switching, by the solar controller, the second battery charging mode to the first battery charging mode upon determining that a second charger mounted in the vehicle is charging the second battery and a battery voltage of the second battery exceeds a reference voltage.

15. The solar charging method of claim 14, wherein the second charger is implemented as an inverter or a regenerative brake system.

16. The solar charging method of claim 9, wherein the determining of when the start of the vehicle is activated includes:
    waking up the battery management system upon determining that the start of the vehicle is deactivated;
    determining when an output power of the solar panel exceeds a target power; and
    charging the battery upon determining that the output power of the solar panel exceeds the target power.

17. The solar charging method of claim 16, further including:
    activating a charging standby mode upon determining that the output power of the solar panel does not exceed the target power.

18. A solar charging system for a vehicle, the solar charging system comprising:
    a battery configured to be mounted in the vehicle;
    a solar panel mounted on the vehicle to perform solar power generation thereby; and
    a solar controller connected to the solar panel and the battery and configured to:
        receive electricity generated from the solar panel; and
        control charging of the battery using the electricity,
    wherein the battery includes a first battery and a second battery, and
    wherein the solar controller is configured to:
        compare a state of charge of the first battery and a state of charge of the second battery through a battery management system when a start of the vehicle is determined to be activated;
        select one of the first battery and the second battery as a charging target based on a result of comparing the state of charge of the first battery and the state of charge of the second battery; and
        activate a charging mode for charging the selected one of the first battery and the second battery.

\* \* \* \* \*